United States Patent
Burkett

[11] 4,013,323
[45] Mar. 22, 1977

[54] REMOTE CONTROL BRAKE SYSTEM FOR A RAILWAY TRAIN

[75] Inventor: Richard O. Burkett, Apollo, Pa.

[73] Assignee: Westinghouse Air Brake Company, Wilmerding, Pa.

[22] Filed: June 9, 1976

[21] Appl. No.: 694,143

[52] U.S. Cl. .................................. 303/20; 303/75
[51] Int. Cl.² ........................................ B60T 13/68
[58] Field of Search .......................... 303/3, 15–17, 303/20, 75–79

[56] References Cited

UNITED STATES PATENTS

| | | | |
|---|---|---|---|
| 3,539,226 | 11/1970 | Barber | 303/16 X |
| 3,560,055 | 2/1971 | Worbois | 303/20 |
| 3,588,185 | 6/1971 | Cannon | 303/20 |
| 3,588,186 | 6/1971 | Worbois | 303/20 |

*Primary Examiner*—Duane A. Reger
*Attorney, Agent, or Firm*—R. W. McIntire, Jr.

[57] ABSTRACT

A remote control brake system for a railway train in which the caboose is equipped to receive radio signals transmitted from the locomotive indicative of a brake application initiated by the locomotive engineer. The received radio signals are interpreted and converted into control signals which operate magnet valves via which fluid pressure in an equalizing reservoir on the caboose is reduced an amount depending upon the duration of the transmitted brake application signal. The equalizing reservoir is charged in the absence of a brake application signal by the pressure in the brake pipe and serves as the control pressure for operating a self-lapping relay valve which is arranged to exhaust brake pipe pressure responsive to a reduction of pressure in the caboose equalizing reservoir. The train brake pipe pressure is thus reduced concurrently from the front and rear ends when a brake application is initiated to provide faster and better synchronized response of the train brakes. Since the train brake pipe is charged from the front end only, a pressure gradient exists during charging. This so-called false brake pipe gradient is detected by a special circuit at the locomotive to prevent a brake application signal from being transmitted to the caboose until the pressure gradient in the brake pipe equalizes, thereby preventing undesired release of a brake application by reason of the pressure gradient flowing toward the rear of the brake pipe after the brakes have applied.

13 Claims, 1 Drawing Figure

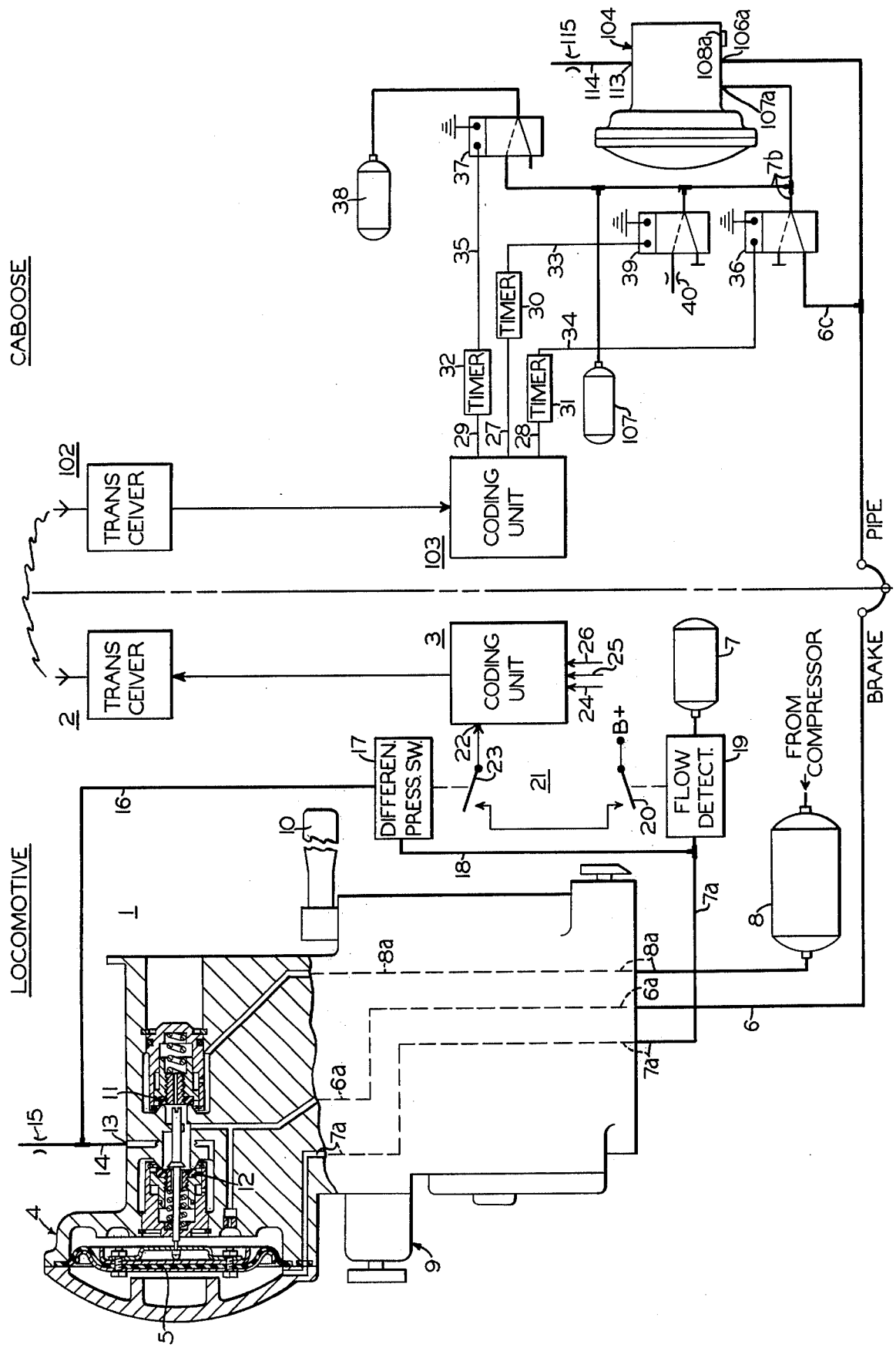

REMOTE CONTROL BRAKE SYSTEM FOR A RAILWAY TRAIN

BACKGROUND OF THE INVENTION

The present invention is related to a remote control brake system for a railway train which employs radio signals as the means for transmitting brake command signals from the train locomotive to a control car remote from the locomotive. Remote brake control systems of this type are generally well known, employing a control car located near the midpoint of the train which responds to the radio transmitted brake commands from the locomotive to effect variation of the train brake pipe pressure from this remote location at the same time and to the same extent as the variation of brake pipe pressure occurring at the locomotive. Such a system, while being rather complex and thus expensive, does lend itself to improved train control through faster and more uniform brake response, being particularly advantgeous on the long trains commonly operated by the railroads today.

SUMMARY OF THE INVENTION

One object of the present invention is to provide a simplified and less costly remote control brake system by eliminating the function of charging the train brake pipe pressure from a remote control car.

In eliminating this remote charging of brake pipe pressure, radio control of brake releases is, of course, sacrificed for the sake of economy, which comes about through the consequent elimination of the brake valve device, air compressor with its attendant controls and brake control center normally associated with the remote control car. Furthermore, eliminating this remote charging of brake pipe pressure reduces the system logic requirements, thus allowing for a simplified and less costly coding unit.

The system according to the invention contemplates locating the remote control car at the end of the train, the caboose for example, with brake pipe charging being accomplished via the brake valve in the locomotive in a manner typical of conventional brake systems. A relay valve at the caboose similar to the conventional brake valve relay valve device is subject at opposite sides of its control pistons to the pressure carried in the brake pipe until such time as a radio signal is received from the locomotive indicating initiation of a brake application. When this occurs, one or more electromagnetic valves at the caboose become operative to isolate brake pipe pressure from one side of the relay valve control piston and to effect a reduction of this control pressure by equalization into a volume reservoir or by venting to atmosphere. The caboose relay valve is in turn operative responsive to this reduction of control pressure from the one side of its control piston to effect a corresponding reduction of brake pipe pressure from the rear end of the train until such time as the brake pipe pressure opposing the relay valve control pressure corresponds therewith. Consequently, brake pipe pressure is reduced concurrently at both the front and rear of the train to produce faster more uniform response of the brake application.

In eliminating remote charging of the brake pipe, as above proposed, the possibility of unintentional brake releases following a brake application arises due to false brake pipe gradient existing at the time the brake application is initiated. False brake pipe gradient refers to the pressure differential between the front and rear ends of the train brake pipe due to the time lag in charging the rear end from the pressure at the front end and is distinguished from true brake pipe gradient, which is the pressure differential resulting from brake pipe leakage after the brake pipe has been fully charged. This phenomenon of unintentional brake release is undesirable and occurs when a pressure wave flows rearward under the influence of a gradient between the front and rear ends of the brake pipe. Since the remote control car vents brake pipe pressure at the rear end in parallel with the reduction initiated at the front end, the pressure gradient in effect at the time of a brake pipe reduction remains in effect after the reduction, thus giving rise to the pressure wave, in response to which the car control valves effect release of the car brakes.

It is therefore a further object of this invention to automatically detect a condition of false brake pipe gradient at the time a brake application is initiated and to suppress radio transmission of the brake application to the remote control car until the pressure gradient is dissipated.

This objective is accomplished by providing a differential pressure switch in series with an equalizing reservoir flow detector switch whose contact closure is indicative of a brake application. A separate signal corresponding to this brake application is transmitted to the remote control car, provided the differential pressure switch contact is concurrently closed. The differential pressure switch is subject to the brake valve equalizing reservoir pressure and to brake pipe exhaust back pressure developed at the brake valve exhaust port. In the event a brake application is initiated prior to the brake pipe being fully charged either initially or following a previous brake application, the pressure gradient along the brake pipe may be such that the degree of brake pipe reduction called for will be insufficient to reverse the rearward flow of brake pipe air so that the amount of air vented to atmosphere via the brake valve exhaust port is insufficient to create any significant back pressure. Accordingly, a pressure differential capable of actuating the differential pressure switch arises and the brake application signal becomes interrupted to suppress transmission of such signal until the pressure gradient equalizes between the front and rear ends of the brake pipe. When this occurs, brake pipe pressure will then begin to exhaust at the brake valve exhaust port to generate sufficient exhaust back pressure and accordingly destroy the pressure differential at the differential pressure switch, which is consequently conditioned to enable transmission of the brake application signal to the remote control car.

The remote control car responds to the brake application signal, as previously explained, to vent brake pipe pressure concurrently with the venting of brake pipe pressure at the locomotive brake valve device. It will be appreciated that in forestalling this reduction of brake pipe pressure from the rear end until the pressure gradient along the brake pipe is dissipated or equalized, the problem of unintentional brake release due to a false brake pipe gradient is eliminated. It will be further appreciated, of course, that the locomotive engineer is aware of this forestalling of the brake application signal to the remote control car when a condition of false brake pipe gradient exists and in accordance with standard operating procedures, he will normally make a brake pipe reduction somewhat greater than that necessary to equalize the gradient in order to assure a brake application on the cars toward the rear of the train as well as those at the head end.

Other objects and advantages of this invention will be apparent from the following more detailed explanation when taken with the accompanying single FIGURE drawing showing a block diagrammatic of a remote brake control system according to the invention.

DESCRIPTION AND OPERATION

Referring now to the drawing, there is shown to the left of the dashed center line equipment employed on the locomotive and to the right of the center line equipment employed on the caboose or remote control car. Included in the locomotive equipment is a conventional engineer's brake valve device 1 of the No. 26 type, which is well known to those skilled in the railway fluid pressure braking art, a conventional type transceiver unit 2 and a conventional type coding unit 3, which accepts digital input signals according to the brake command evoked through the brake valve device 1 and converts these inputs into the proper form for transmission to the caboose by transceiver 2. Typically, transceiver 2 forms the train communication system which operates via radio waves.

A self-lapping type relay valve portion 4 of brake valve device 1 is subject on opposite sides of a control piston 5 to fluid pressure in brake pipe 6 via passage 6a and to fluid pressure in equalizing reservoir 7 via pipe and passage 7a. As is well known, equalizing reservoir pessure is developed from the pressure carried in main reservoir 8 in accordance with the setting of regulating valve portion 9 of brake valve 1. Inasmuch as equalizing reservoir pressure is the pilot or control pressure to which relay valve portion 4 responds to vary brake pipe pressure, regulating valve portion 9 is arranged so that operation of the brake valve handle 10 will effect variation of the equalizing reservoir pressure. A passage 8a connects fluid pressure from main reservoir 8 to relay valve portion 4 for supplying fluid pressure to brake pipe 6 via a supply valve 11 when control piston 5 is moved in a rightward direction. When moved in a leftward direction, control piston 5 opens an exhaust valve 12 to vent pressure from brake pipe 6 to atmosphere via an exhaust port 13 and pipe 14.

Pipe 14 is arranged with a choke fitting 15 near its outlet and is connected by a branch pipe 16 to a differential pressure switch 17. Also connected to pressure switch 17 via branch pipe 18 of pipe 7a is fluid pressure in equalizing reservoir 7. A flow detector switch 19 of conventional design is located in pipe 18 and includes a normally open set of electric contacts 20 in a false pressure gradient detector circuit 21 via which a source of power B+ is connected to a control input 22 of coding unit 3. Contacts 20 close when the pressure in equalizing reservoir 7 is reduced and remain closed for the duration of the reduction, that is until the equalizing reservoir pressure has exhausted to a value chosen by the position of brake valve handle 10 in the service brake application zone. False gradient detector circuit 21 also includes a set of normally open electric contacts 23 of differential pressure switch 17 in series with contacts 20. These contacts 23 close whenever the differential between the pressure in pipes 16 and 18 is less than approximately 10 psi., which is the case any time a brake application is made under normal conditions of brake pipe gradient.

In addition to control input 22, coding unit 3 is provided with a plurality of additional inputs via brake application wires 24, 25 and 26, whereby the coding unit is fed information corresponding to the type of brake application being made, as for example a service, minimum service or emergency application, respectively.

The caboose equipment includes devices similar to those described relative to the locomotive equipment, with like devices being identified by reference numerals differing by 100.

A transceiver 102 on the caboose is receptive to the radio signals emitted by the locomotive transceiver 2 and relays the information to a coding unit 103, which interprets the code in order to initiate a brake application from the caboose in parallel with the application made by the engineer at the locomotive. Connected to coding unit 103 by wires 27, 28 and 29 are timers 30, 31 and 32 respectively. An output signal at one or a combination of these wires indicates the particular brake application interpreted by coding unit 103. Timer 30 is a conventional delay on pick up type having a relatively short delay of approximately 1.5 seconds following energization of wire 27 before emitting an output signal via wire 33. Timers 31 and 32 are conventional delay on drop out types which maintain a signal at output wires 34 and 35 for a predetermined duration following deenergization of wires 28 and 29. The duration the signal is maintained by timer 31 is approximately 45 seconds and the duration the signal is maintained by timer 32 is approximately 3 seconds.

Brake pipe 6 extends from the locomotive to the caboose of the train where it is connected to port 106a of relay valve device 104. Brake pipe 6 is also connected via branch pipe 6c to a conventional, two-way electro-magnetic valve device 36 to which wire 34 is connected to effect energization thereof. In the deenergized condition of valve device 36, branch pipe 6c is connected to a pipe 7b leading to port and passage 107a of relay valve 104, to an equalizing reservoir 107 corresponding in size to the locomotive equalizing reservoir 7 and to a conventional two-way electro-magnetic valve device 37 to which wire 35 is connected to effect energization thereof. In the energized condition of electro-magnetic valve 36, pipe 7b is cut off from branch pipe 6c. In the deenergized condition of electro-magnetic valve device 37, a reservoir 38 having a volume selected to provide a preselected reduction of pressure in equalizing reservoir 107 is cut off from pipe 7 and is vented to atmosphere. The volume of reservoir 38 is selected to provide a reduction of brake pipe pressure corresponding to a minimum service brake application. Pipe 7b also leads to a conventional, two-way electro-magnetic valve device 39 to which wire 33 is connected to effect energization thereof. In the deenergized condition shown, valve device 39 cuts off pipe 7b from atmosphere and connects pipe 7b to atmosphere via a choke 40 in the energized condition. Choke 40 is selected to produce a service rate of reduction of pressure from pipe 7b when the latter is connected to brake pipe 6 via branch pipe 6c in the energized condition of valve device 36.

Relay valve device 104 is further provided with an exhaust port 113 to which a pipe 114 having a choke fitting 115 is connected to effect venting of brake pipe pressure at the caboose. Also, port and passage 108a is blanked.

In operation, brake pipe 6 is charged from the pressure stored in main reservoir 8 in a manner well known to those skilled in the art. Briefly reviewing this charging procedure, handle 10 of brake valve device 1 is placed in release position wherein regulating valve 9 establishes and maintains a predetermined equalizing reservoir pressure in accordance with the setting at which the regulating valve is selectively adjusted. Relay valve 4 of the brake valve operates in response to this equalizing reservoir pressure to actuate its control piston and consequently open supply valve 12. Fluid under pressure stored in main reservoir 8 is connected to the brake pipe via passageway 8a, the open supply valve 12 and passageway 6a until brake pipe pressure balances the equalizing reservoir pressure across control piston 5. When this occurs, the supply valve closes, terminating charging of brake pipe 1 at the pressure selected by adjustment of regulating valve 5.

As brake pipe 6 is being charged, the brake pipe air flows through each car of the train to the caboose where it flows to port and passage 106a of relay valve device 104 and to electro-magnetic valve 36 via branch pipe 6c. Being deenergized during charging, valve 36 connects brake pipe air from branch pipe 6c to pipe 7b leading to port and passage 107a of relay valve 104 and to equalizing reservoir 107. In this manner, equalizing reservoir 107 is charged to the same pressure as brake pipe 6, which is in turn determined by the pressure to which equalizing reservoir 7 is charged, so that equalizing reservoirs 7 and 107 are charged to substantially the same pressure, discounting the difference due to leakage gradient in the brake pipe. It will be appreciated therefore that the locomotive air supply system, such as the conventional air compressor and controls (not shown) which provide and maintain pressure in main reservoir 8, also serves to provide the air required to control the caboose equipment, thus eliminating the need for additional air supply equipment as heretofore known in remote control brake equipments. In the absence of a separate caboose air supply system, therefore, the brake pipe 6 is charged from the locomotive only. By properly tuning relay valve 104, brake pipe pressure supplied to port and passage 106a will lag the equalizing reservoir pressure effective at port and passage 107a to assure that the relay valve control piston is moved to its supply position. In that port and passage 108a is blanked, however, it will be obvious that the only function of relay valve 104 is to control the exhaust of brake pipe pressure, which is cut off in this supply position that the relay valve control piston assumes during charging.

In initiating a brake application subsequent to completely charging the brake pipe 6, a reduction of pressure in equalizing reservoir 7 is made, which for example can be accomplished in the conventional, well-known manner by moving brake valve handle 10 into the service brake application zone according to the degree of brake application desired. other less conventional, yet well-known arrangements, such as those employed in push button operated remote multiple unit brake control systems may also be employed for the purpose of effecting the desired reduction of equalizing reservoir pressure. In either case, relay valve device 4 is operative in response to the resulting equalizing reservoir brake pipe pressure differential across its control piston 5 to unseat exhaust valve 12 and thereby vent brake pipe pressure to atmosphere via port and passage 6a, the open exhaust valve, exhaust port 13, pipe 14 and choke fitting 15.

Concurrently, a signal is provided at coding unit 3 via one of wires 24, 25 or 26, depending upon the type of brake application initiated and is maintained for the duration of the equalizing reservoir reduction corresponding to the brake application being made. The equalizing reservoir pressure reduction initiating the brake application is sensed by flow detector 19 to effect closure of contacts 20 in false gradient detector circuit 21. Contacts 23 in series with contacts 20 also close any time back pressure in branch pipe 16 develops sufficiently to approach within approximately 10 psi. of equalizing reservoir pressure, such back pressure being selected as indicative of the exhaust of brake pipe pressure at port 13 that occurs whenever the brake pipe 6 is fully charged. Prior to being fully charged, the brake pipe gradient is such that brake pipe pressure tends to flow toward the caboose and consequently insufficient pressure exhausts at port 13 to develop enough back pressure in pipe 16 to effect closure of contacts 23 of differential pressure switch 17. With both contacts 20 and 23 closed, a signal is provided at coding unit 3 indicative of the absence of false brake pipe gradient. Coding unit 3 is thus enabled to act upon the signal at wire 24, 25 or 26 and to pass a corresponding binary coded signal to transceiver 2 for transmitting the proper brake application signal to the remote unit. This brake application signal continues to be transmitted as long as wire 24, 25 or 26 remains energized.

At the caboose, transceiver 102 receives the coded transmission from the locomotive and relays it to coding unit 103 where it is decoded. Assuming the transmitted brake application signal is a minimum service brake application signal, coding unit 103 functions to energize wires 28 and 29 simultaneously to accordingly activate timers 31 and 32. The output of timer 31 energizes electro-magnetic valve 36 to isolate the pressure of equalizing reservoir 107 from brake pipe pressure, while the output of timer 32 energizes electromagnetic valve 37 to connect the isolated equalizing reservoir pressure to reservoir 37. The consequent equalization between reservoirs 107 and 37 produces a reduction of pressure in equalizing reservoir 107 a predetermined amount, as determined by the relative volume of these reservoirs, corresponding to a minimum service brake application. Timer 32 delays disappearance of its output signal approximately three second following loss of the signal at wire 29 when the equalizing reservoir reduction at the locomotive is terminated in order to maintain valve 37 energized for a duration sufficient to assure equalization of pressure between reservoirs 107 and 38.

At relay valve device 104, this minimum service reduction of pressure in equalizing reservoir 107 is reflected at port and passage 107a to create a pressure differential across the relay valve control piston sufficient to move the piston from its lap position, in which it is stable when a pressure balance exists, to its exhaust position in which brake pipe pressure is vented to atmosphere via port and passage 106a, the open relay valve exhaust valve, port and passage 113, pipe 14 and choke 115. Consequently, brake pipe pressure is vented at the caboose in concert with the reduction initiated at the locomotive to not only accelerate but also to better synchronize the brake application on the cars toward the rear end of the train relative to the cars at the head end. Choke 115 controls the brake pipe exhaust at the caboose so as to pull down brake pipe pressure from the rear end at substantially the same rate as the rate of brake pipe reduction occurring at the locomotive.

In the event a service brake application in excess of a minimum service application is desired, the appropriate wire 24, 25 or 26 is energized to set up coding unit 3 to provide transceiver 2 with the appropriate code for transmitting a service brake application signal to the caboose, provided coding unit 3 is enabled by a signal at input 22 in the absence of a false brake pipe gradient condition being detected by circuit 21.

Thus, while brake valve 1 is making a further service reduction of equalizing reservoir pressure and a corresponding reduction of brake pipe pressure at the caboose in a manner as described in making a minimum service reduction, a corresponding equalizing reservoir reduction occurs at the caboose to effect a brake pipe reduction threat.

The coded service brake application signal transmitted to the caboose is interpreted by coding unit 103, which produces a signal at wires 27 and 28. Timer 31 is energized by wire 28 to in turn energize electro-magnetic valve 36 and thereby isolate the pressure in equalizing reservoir 107 from from the brake pipe the same as when making a minimum service brake application. A timer 30 energized by wire 28 energizes electro-magnetic valve 39 after a predetermined delay of approximately 1.5 seconds. When energized, electro-magnetic valve 39 connects pressure from equalizing reservoir 107 to atmosphere via pipe 7b and choke 40. The delay imposed by timer 30 assures that when making a service application following a minimum service application, electro-magnetic valve 37 becomes deenergized prior to energization of valve 39, thereby avoiding the possibility of the equalizing reservoir pressure reduction at the caboose being greater than at the locomotive by concurrent venting via the respective valve devices 37 and 39. Choke 40 is selected so that the reduction of equalizing reservoir pressure at the caboose matches the reduction at the locomotive.

Relay valve 104 responds to the reduction of equalizing reservoir pressure at the caboose to accordingly vent brake pipe 6 thereat. Timer 31 provides a signal at wire 34 to maintain electro-magnetic valve 36 energized for approximately 45 seconds, which is considered sufficient time to produce a full service reduction of the brake pipe pressure. In this sense, timer 31 prevents valve 36 from resetting for a duration sufficient to assure that brake pipe pressure is reduced to the equalizing reservoir pressure and therefore does not increase equalizing reservoir pressure by equalization therewith when valve 36 resets. Upon expiration of this time delay, electro-magnetic valve 36 is reset to restore charging communication between equalizing reservoir 107 and brake pipe 6 via branch pipe 6c and pipe 7b. However, since the equalizing reservoir and brake pipe pressure are substantially the same following this full service brake application, there will be no significant change in the equalizing reservoir pressure at either the caboose or locomotive and the brake applications will remain in effect until the locomotive brake valve handle is moved to release position.

As previously explained, brake pipe pressure is recharged from the locomotive brake valve device 1 when handle 10 is in release position. With electromagnetic valve 36 already establishing fluid pressure communication between brake pipe 6 and equalizing reservoir 107, the brake pipe pressure serves to recharge equalizing reservoir 107 and maintain its pressure in accordance with the brake pipe pressure at the caboose until such time as a brake application signal is subsequently transmitted to the caboose via transceivers 2 and 102.

Now in the event a brake application is instigated prior to the brake pipe being fully recharged, the brake pipe gradient existing during charging of the brake pipe will preclude the exhaust of brake pipe pressure at exhaust port 13 of brake valve 1 due to the higher pressure at the head end of the brake pipe flowing toward the rear of the brake pipe to equalize with the lower brake pipe pressure thereat. In the absence of brake pipe exhaust of any significance at the locomotive brake valve in consequence of this false brake pipe gradient, therefore, pipe 16 leading to differential pressure switch 17 is void of back pressure. With pipe 7a and branch pipe 18 subject to equalizing reservoir pressure, it will be apparent that the differential pressure at switch 17 exceeds the predetermined pressure differential below which contacts 23 of switch 17 are closed. Thus, contacts 23 are open to interrupt power in false gradient detector circuit 21 and thereby disable coding unit 3. The brake application signal at inputs 24, 25 or 26 is therefore ignored and no brake application signal is transmitted to the caboose for the duration a false brake pipe gradient condition exists.

When the brake pipe pressure gradient becomes equalized by reason of the head end pressure flowing rearwardly, the brake pipe pressure will begin to exhaust at the relay valve exhaust port 13 of brake valve 1 until the brake pipe pressure reduction corresponds to the reduction of equalizing reservoir pressure. At this time, back pressure develops in branch pipe 16 sufficient to destroy the high pressure differential holding contacts 23 of pressure switch 17 open, thereby effecting closure of these contacts 23 to complete circuit 21. Accordingly, input 22 is energized, enabling coding unit 3 to act on the brake application signal effective at input 24, 25 or 26. The brake application signal is then transmitted to the caboose where brake pipe pressure is reduced via relay valve 104 concurrently with the reduction occurring at the locomotive via relay valve 4 of brake valve device 1.

It will now be appreciated that in suppressing a brake pipe reduction at the caboose during a condition of false brake pipe gradient until such time as the gradient is dissipated, unintentional release of rear end brakes on the train is prevented from occurring, it being understood that such unintentional brake release would otherwise occur if a reduction of brake pipe pressure were made at the caboose with false brake pipe gradient in effect, as the false brake pipe gradient would still exist following the brake application and would result in a front to rear pressure wave along the brake pipe to inadvertently effect a release of the rear end brakes.

Having now described the invention, what I claim as new and desire to secure by Letters Patent, is:

1. A remote control brake system for a railway train having a continuous brake pipe extending through the train in which fluid pressure is varied for control of the train brakes, said system comprising:
   a. a first equalizing reservoir;
   b. a brake valve device to which said first equalizing reservoir and one end of said brake pipe is connected, said brake valve device being operable to effect variation of fluid pressure in said first equalizing reservoir, in response to which said brake valve device is operable to effect a corresponding variation of fluid pressure in said brake pipe;

c. means for signalling a brake command in accordance with operation of said brake valve device;

d. means for transmitting said brake command signal;

e. means for receiving said transmitted brake command signal at a location along the train remote from said transmitting means; wherein the improvement comprises:

f. a second equalizing reservoir connected to said brake pipe at said remote location, said second equalizing reservoir being charged to the pressure of said brake pipe at said remote location;

g. control means for cutting off charging of said second equalizing reservoir and concurrently effecting venting of fluid pressure therefrom in accordance with said brake command signal being indicative of a brake application; and h. valve means for venting fluid pressure from said brake pipe at said remote location in response to a perponderance of fluid pressure in said second equalizing reservoir relative to the fluid pressure of said brake pipe at said remote location.

2. The brake control system as recited in claim 1, further comprising circuit means for preventing said signalling means from providing said brake command signal when a false pressure gradient condition of said brake pipe exists at the time of a brake application.

3. The brake control system recited in claim 2, wherein said circuit means comprises:

a. an electrical circuit via which a source of power is connected to provide a disabling signal to prevent operation of said signalling means;

b. a first normally open contact in said circuit;

c. a flow detector switch for closing said first contact in response to flow of fluid pressure from said first equalizing reservoir when the pressure thereof is reduced to initiate said brake application;

d. a second normally open contact in series with said first contact; and e. a differential pressure switch for closing said second contact in response to a predetermined pressure differential between the fluid pressure of said first equalizing reservoir and back pressure from the exhaust of fluid pressure from said brake pipe via said brake valve device.

4. The brake control system as recited in claim 3, further characterized in that:

a. said means for signalling a brake command includes a coding unit having an output via which a binary code signal is provided representative of different brake commands supplied via a plurality of inputs of said coding unit;

b. said transmitting means being connected to said output for transmitting the binary code brake command, and c. said disabling signal being connected to said coding unit to prevent said coding unit from providing said binary code brake command signal.

5. A brake control system as recited in claim 1, wherein said receiving means includes means for recognizing said transmitted brake application signal and providing output signals accordingly.

6. A brake control system as recited in claim 5, wherein said control means comprises:

a. a first valve device via which the pressure of said brake pipe is connected to said second equalizing reservoir in the deenergized condition thereof, one of said output signals being connected to said first valve device to effect energization thereof when said brake command signal is representative of a brake application to accordingly disconnect said brake pipe pressure from said second equalizing reservoir;

b. a volume reservoir;

c. a second valve device to which a second one of said output signals is connected to effect energization thereof when said brake command signal is representative of a minimum service brake application whereby said equalizing reservoir pressure is connected via said second valve device to said volume reservoir, said second valve device disconnecting said volume reservoir from said second equalizing reservoir and venting said volume reservoir when deenergized in the absence of said second one of said output signals.

7. The brake system as recited in claim 6, wherein said control means comprises means for maintaining energization of said second valve device a predetermined period following loss of said second one of said output signals sufficient to assure full pressure equalization between said second equalizing reservoir and said volume reservoir.

8. The brake system as recited in claim 6, wherein said control means further comprises a third valve device connected to a third one of said output signals for effecting energization thereof when said brake command signal corresponds to a service brake application to vent said second equalizing reservoir pressure and to interrupt said venting when deenergized in the absence of said third one of said output signals.

9. The brake system as recited in claim 8, wherein said control means further comprises means for delaying energization of said third valve device responsive to said third one of said output signals for a predetermined duration sufficient to assure deenergization of said second valve device prior to energization of said third valve device.

10. The brake control system as recited in claim 5, wherein said control means comprises:

a. a first valve device via which said brake pipe pressure is connected to said second equalizing reservoir in the deenergized condition thereof, one of said output signals being connected to said first valve device to effect energization thereof when said brake command signal is received representative of a brake application to accordingly disconnect said brake pipe pressure from said second equalizing reservoir; and b. a second valve device connected to a different one of said output signals for effecting energization thereof when said brake command signal corresponds to a service brake application to vent said equalizing reservoir pressure and to interrupt said venting when deenergized in the absence of said different one of said output signals.

11. The brake control system as recited in claim 10, wherein said control means further comprises means for maintaining energization of said first valve device a predetermined period following disappearance of said one of said output signals sufficient to assure said reduction of said brake pipe pressure at said remote location by said second relay valve prior to said brake pipe pressure being connected to said second equalizing reservoir when said brake application signal is terminated.

12. The brake system as recited in claim 1, further characterized in that said brake pipe is terminated in the caboose of said train, said caboose comprising said remote location along the train where said brake application signal is received.

13. The brake system as recited in claim 1, further characterized in that said transmitting means transmits said brake application signal via radio waves.

* * * * *